Dec. 1, 1953  R. W. PRESSWELL  2,661,389
ELECTRIC CABLE
Filed March 14, 1949
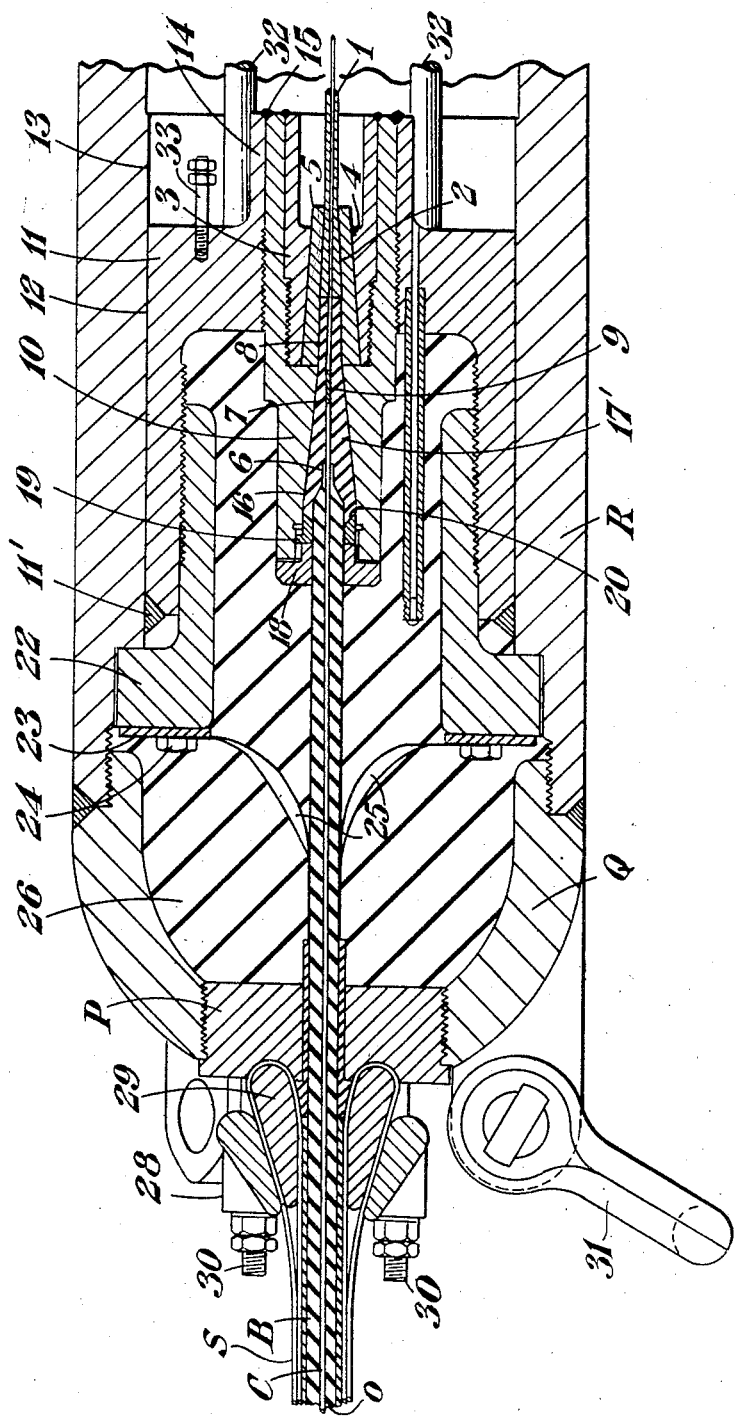
Inventor:
Richard William Presswell;
by his attorneys,
Baldwin, Wight, & Prevost Patented Dec. 1, 1953

2,661,389

UNITED STATES PATENT OFFICE 2,661,389

ELECTRIC CABLE

Richard William Presswell, Kensington, London, England, assignor to Telegraph Construction & Maintenance Company Limited, London, England, a company of Great Britain Application March 14, 1949, Serial No. 81,325

Claims priority, application Great Britain March 22, 1948

5 Claims. (Cl. 174—50)

This invention relates to means for sealing an electric cable at its point of entry into a container housing auxiliary apparatus. It is concerned more particularly with glands for sealing the point of entry of a thermoplastic insulated submarine cable into the housing of a submerged repeater.

It will be realized that at sea bottom, the hydrostatic pressure exerted on the cable at its junction with the repeater housing is very considerable, and in fact may be of the order of four tons per square inch in deep water. Under such conditions water or water vapor may be forced into the interior of the housing either through the body of the dielectric or along the co-acting dielectric and metal surfaces. In addition, this great hydrostatic pressure may cause cold flow of the dielectric into the housing or in some cases may even tend to force the conductor to move longitudinally into the housing.

The object of the present invention is to provide a form of seal which is capable of setting up an effective resistance to the pressure prevailing so that the possibility of deformation of the dielectric is reduced to a minimum if not eliminated entirely, as is also that of water penetration.

Sealing means for the entry of the cable conductor into the repeater or other housing, according to this invention comprises inner and outer metallic sleeve elements having mutually co-operative wedge form surfaces, between which is held an intermediate sleeve of dielectric material, the inner sleeve being adapted to provide an electrical connection between the cable conductor and the repeater or other auxiliary apparatus.

Preferably instead of directly connecting the inner conductor of the cable to the auxiliary apparatus this is done through an auxiliary conductor, which possesses a higher tensile strength than that of the cable conductor.

In accordance with the invention, the seal is formed by fitting onto an auxiliary conductor connected to the cable conductor, a sleeve termed the inner sleeve and having a tapered outer surface adapted to co-operate with the complementarily internally tapered surface of an intermediate sleeve formed of a rigid dielectric, which intermediate sleeve in turn has wedge engagement with the inner wall of an outer metallic sleeve.

Preferably the interior of the outer metallic sleeve not occupied by the rigid dielectric sleeve, is filled with a water-resistant dielectric material.

According to a further feature of the invention a sealing device for sealing a submarine cable core at its entry into a casing which houses auxiliary apparatus for submersion with the cable comprises a body of dielectric material which is water resistant and united to the cable core and to the metal surface of the inlet opening of the casing, said waterproof body being mechanically supported on the interior side by an auxiliary seal provided by interfitting concentric metallic sleeves enclosing the central conductor.

The invention is illustrated in the accompanying drawing which is a part sectional view of a lump type repeater casing having a cable entry gland constructed in accordance with a preferred embodiment of the invention.

Referring to the drawing R indicates generally the repeater casing or housing having an end cap Q, the opening to which is closed by a gland plug P, the plug P being provided with a central aperture for the cable indicated generally at O. C is the inner conductor over which is a cover B of dielectric material, S being part of the outer armorings.

The cable entry gland according to this invention comprises essentially two sleeves, central sleeve 1 and an outer sleeve 3, both the sleeves 1 and 3 being formed of a high strength conductive material, e. g. steel. The sleeve 1 has an inner bore to receive the inner conductor with a close fit and at its inlet end has an externally tapered portion 2 for co-operation with an intermediate sleeve 5 which is formed of dielectric material and tapered externally at 4.

The central and outer sleeves 1 and 3 have complementary tapers so as to be capable of exerting a mutual wedging action on said intermediate sleeve 5. The intermediate sleeve 5 is formed of a relatively hard dielectric material and has its inner and outer surfaces tapered as shown to correspond to the tapers of the inner and outer sleeves 1 and 3. It is preferably formed of an uncompressible ceramic material such as the high alumina insulators known under the Registered Trade-Mark "Corundite" or as "Bluestone."

For connecting up a polythene insulated submarine cable to the repeater apparatus installed within the pressure resistant casing R, the cable core b is stripped of its armorings S as shown and the core insulation tapered down to the conductor as at the point indicated at 6. Instead of continuing the conductor C into the repeater housing, it is preferred to cut it off at the point indicated at 7 where it is secured to an auxiliary conductor 8 by means of a joint 9 so as to be continuous therewith, the conductor 8 having a greater tensile strength than that of the conductor C. The conductor 8, which may consist of phosphor bronze, is a push fit into the sleeve 1. Before fitting the central sleeve 1 to the auxiliary conductor, the inner, intermediate and outer sleeves are fitted together, after coating their co-operating surfaces with an appropriate cement such as the synthetic resin cement known under the Registered Trade-Mark "Araldite," and the parts are heated while continuing to apply pressure so as to form a solid integral unit.

Surrounding the outer sleeve 3 is a gland assembly member 10, which is screwed into position over the sleeve and itself provides a mounting for a bulkhead piece 11, the outer diameter 12 of which is a close fit within the bore 13 of the repeater casing R itself. It will be observed that the bulkhead 11 terminates in a shouldered flange or collar 14 that is co-terminous with the outer sleeve 3 and gland assembly 10. In order to prevent ingress of moisture between the jointing surfaces of 3, 10 and 14, welds 15 are provided at their inner ends.

The tapered interior 16 of the gland assembly member 10 and the unfilled portion of the intermediate sleeve 5 not occupied by the central sleeve 1 are filled with a water resistant dielectric material. In practice a "pudding" 17 of polythene or other high grade dielectric and water resisting material, corresponding in shape to the taper shape of the interior of the gland assembly is formed on the cable core and conductors such as by injection moulding in a suitable mould and is then fitted into the unit composed of the parts 1, 3, 5 and 10, the auxiliary conductor being threaded through the central bore of the inner conductive sleeve 1. It will be observed that the intermediate sleeve 5 extends beyond the entrance end of the central sleeve to provide a pocket which is filled with the thermoplastic pudding. A suitable cement, for instance polyisobutylene compound, is applied over the "pudding" to enhance its adhesion to the steel gland member 10 and "Corundite" sleeve when heat is applied, the object being to avoid leakage paths by which water may seep in. Finally the conductor 8 is united by bracing as at 15' to the inner end of the inner conductive sleeve so as to close the aperture completely.

It will thus be seen that the present invention provides an effective and substantially moisture-proof seal at the entry of the conductor into the repeater housing or casing, this seal being constituted by a body of dielectric material described above as the "pudding" and which is united, preferably by an operation known as "bonding" to the cable core and the metallic surface of the inlet opening to the housing, the "pudding" being supported on the interior or low pressure side by a metallic barrier which includes concentric sleeves centred on the cable conductor.

In order to increase adhesion between the insulation and metal surfaces, we may employ a method in which a layer of polyisobutylene is bonded to the polythene surface of the "pudding" and then impregnated with a polymerisable organic compound, e. g. monomeric styrene. When the treated "pudding" is subsequently heated in contact with the steel sleeve a firm and waterproof bond is achieved. A somewhat similar technique may be used to increase the adhesion of the conductor to the "pudding" moulded thereonto, and also between the "pudding" and the ceramic and inner conductive sleeves of the gland.

As an alternative to this method we may employ one in which "wetting" of the metal surface with polythene is achieved by oxidising or phosphatising the metal surface.

The entry of the cable core into the gland assembly 10 is sealed by a gland closure shown as a, nut 18 screwing into the end of the assembly to engage with an annular washer 19 which may be spring loaded having a reversely tapered inner end 20 which tends to force the "pudding" against the inner conductor sleeve 1.

The bulkhead 11, having been sealed in position by means of a weld 11', is supported by a closing ring 22 which screws into part 11 and has fastened to it a bonding clamp 23 by screws 24, the latter serving for the connection of the copper return conductor tapes 25.

Before closing up the open end of the repeater casing R by means of the gland plug P, the interior of the end piece Q is filled with polythene-polyisobutylene compound 26. Having screwed the plug P into position the armoring wires S are fastened down by means of a conical locking ring 28 which co-operates with an inner cone 29, the whole forming a clamp held in position by clamping studs 30. 31 is a shackle. 33 is an earthing terminal.

It will be understood that the gland assembly including the bulkhead 11 is duplicated at the other end of the casing R, the two bulkheads being held against relative displacement by spacer bars 32.

It will be appreciated that the conductive, dielectric and steel sleeves 1, 3 and 5 effectively prevent cold flow of the polythene "pudding" since its movement is opposed by a continuous solid barrier, and penetration of moisture into the repeater housing by seepage along the conductor becomes impossible since the latter terminates in a metallic sleeve in which it is solidly brazed.

I claim:

1. Means for sealing the entry of a cable conductor into a housing comprising an inner metallic sleeve having a tapered outer surface carried by a cable conductor and sealed thereto and extending axially through said housing, an outer metallic sleeve supported from said housing and sealed thereto and concentrically surrounding said inner metallic sleeve, said outer metallic sleeve having a tapered inner surface that is substantially complementary to the tapered outer surface of said inner metallic sleeve, an intermediate sleeve of insulation material having inner and outer tapered surfaces respectively engaging the tapered surfaces of said inner and outer sleeves and forming a seal therewith and an insulation compound surrounding said conductor and enclosed by said housing and disposed adjacent one end of said sleeves, the joints between said sleeves substantially precluding leakage of said compound around the cable conductor.

2. Means for sealing the entry of a cable conductor into a housing as set forth in claim 1 in which said intermediate sleeve is a relatively hard dielectric material.

3. Means for sealing the entry of a cable conductor into a housing as set forth in claim 1 in which said intermediate sleeve is formed from an uncompressible ceramic material.

4. Means for sealing the entry of a cable conductor into a housing as set forth in claim 1 in which said inner metallic sleeve carried by said conductor extends approximately one-half the length of said intermediate sleeve and in which a linearly extending conductor projects into the end of said intermediate sleeves and establishes electrical connection with the end of the aforesaid conductor.

5. Means for sealing the entry of a cable conductor into a housing as set forth in claim 1 in which said intermediate sleeve is ceramic.

RICHARD WILLIAM PRESSWELL.

References Cited in the file of this patent

UNITED STATES PATENTS

| Number | Name | Date |
|---|---|---|
| 1,135,376 | Hooker | Apr. 13, 1915 |
| 1,944,138 | King | Jan. 16, 1934 |
| 2,010,145 | Eitel | Aug. 6, 1935 |
| 2,155,650 | Gilbert | Apr. 25, 1939 |
| 2,158,492 | Bishop | May 16, 1939 |
| 2,292,358 | Bishop | Aug. 11, 1949 |
| 2,469,416 | Smyers | May 10, 1949 |
| 2,471,046 | Smith et al. | May 24, 1949 |
| 2,471,468 | Weston | May 31, 1949 |